(12) United States Patent
Takakura et al.

(10) Patent No.: US 11,795,325 B2
(45) Date of Patent: Oct. 24, 2023

(54) CURABLE RESIN COMPOSITION AND ELECTRICAL COMPONENT USING THE SAME

(71) Applicant: DENSO CORPORATION, Kariya (JP)

(72) Inventors: Akira Takakura, Kariya (JP); Hiroyuki Okuhira, Kariya (JP); Katsuhiro Kanie, Kariya (JP)

(73) Assignee: DENSO CORPORATION, Kariya (JP)

( * ) Notice: Subject to any disclaimer, the term of this patent is extended or adjusted under 35 U.S.C. 154(b) by 505 days.

(21) Appl. No.: 16/885,710

(22) Filed: May 28, 2020

(65) Prior Publication Data

US 2020/0362166 A1 Nov. 19, 2020

Related U.S. Application Data

(63) Continuation of application No. PCT/JP2018/042662, filed on Nov. 19, 2018.

(30) Foreign Application Priority Data

Nov. 28, 2017 (JP) .................................. 2017-228315

(51) Int. Cl.
*C08L 75/06* (2006.01)
*C09J 7/10* (2018.01)
(Continued)

(52) U.S. Cl.
CPC .......... *C08L 75/06* (2013.01); *C08G 18/6204* (2013.01); *C08G 18/6229* (2013.01);
(Continued)

(58) Field of Classification Search
CPC ............ C08G 18/6229; C08G 18/6204; C08F 220/14; C08F 220/1804; C08F 220/20; C08F 220/44
See application file for complete search history.

(56) References Cited

U.S. PATENT DOCUMENTS 5,189,096 A * 2/1993 Boutillier ........... C08G 18/6229
525/61
5,324,778 A * 6/1994 Boutillier ........... C08G 18/6212
525/61
(Continued)

FOREIGN PATENT DOCUMENTS

JP H05-17736 A 1/1993
JP 2001040328 A 2/2001
(Continued)

*Primary Examiner* — Michael M Dollinger
(74) *Attorney, Agent, or Firm* — Harness, Dickey & Pierce, P.L.C.

(57) ABSTRACT

A curable resin composition comprises a (meth)acrylic polyol, a hydrogenated polyolefin-based polyol, and a polyisocyanate. The (meth)acrylic polyol includes a polymer having a hydroxyl value of 5 mg KOH/g or more and 150 mg KOH/g or less, a glass transition temperature of −70° C. or more and −40° C. or less, and a number average molecular weight of 500 or more and 20000 or less, and which is liquid at 25° C. The hydrogenated polyolefin-based polyol has an iodine value of 15 or less. An electrical component (1) comprises a sealing member (2) including a cured product of the curable resin composition.

12 Claims, 1 Drawing Sheet (51) Int. Cl.
  *C08G 18/62* (2006.01)
  *C08G 18/73* (2006.01)
  *C08G 18/76* (2006.01)
  *C09J 175/04* (2006.01)

(52) U.S. Cl.
  CPC ............ *C08G 18/73* (2013.01); *C08G 18/76* (2013.01); *C09J 7/10* (2018.01); *C09J 175/04* (2013.01); *C08L 2203/16* (2013.01)

(56) References Cited

U.S. PATENT DOCUMENTS

| | | |
|---|---|---|
| 2007/0179254 A1 | 8/2007 | Wang et al. |
| 2015/0034157 A1 | 2/2015 | Yamada et al. |
| 2016/0312092 A1 | 10/2016 | Yamada et al. |

FOREIGN PATENT DOCUMENTS

| | | |
|---|---|---|
| JP | 2001220573 A | 8/2001 |
| JP | 2013224374 A | 10/2013 |
| JP | 2019099595 A | 6/2019 |
| JP | 2019099597 A | 6/2019 |
| JP | 2019099598 A | 6/2019 |
| JP | 2019099599 A | 6/2019 |
| WO | WO-2005/068529 A1 | 7/2005 |

\* cited by examiner

CURABLE RESIN COMPOSITION AND ELECTRICAL COMPONENT USING THE SAME

CROSS-REFERENCE TO RELATED APPLICATION

The present application is a continuation application of International Application No. PCT/JP2018/042662 filed on Nov. 19, 2018, which claims priority to Japanese Application No. 2017-228315 filed on Nov. 28, 2017. The contents of these applications are incorporated herein by reference in their entirety.

BACKGROUND

The present disclosure relates to a curable resin composition and an electrical component using the same.

Conventionally, a curable resin composition including polyol and polyisocyanate is known.

SUMMARY

One aspect of the present disclosure resides in a curable resin composition comprising: a (meth)acrylic polyol;
a hydrogenated polyolefin-based polyol; and
a polyisocyanate,
wherein the (meth)acrylic polyol includes a polymer having a hydroxyl value of 5 mg KOH/g or more and 150 mg KOH/g or less, a glass transition temperature of −70° C. or more and −40° C. or less, and a number average molecular weight of 500 or more and 20000 or less, and which is liquid at 25° C., and
the hydrogenated polyolefin-based polyol has an iodine value of 15 or less.

BRIEF DESCRIPTION OF THE DRAWINGS

The above and other objects, features, and advantages of the present disclosure will become clearer from the following detailed description with reference to the accompanying drawings. In the drawings.

DETAILED DESCRIPTION OF THE PREFERRED EMBODIMENTS

Conventionally, a curable resin composition including polyol and polyisocyanate is known. For example, JP 2001-40328 A discloses a curable resin composition for a sealing member including a copolymer obtained by polymerizing a radically polymerizable monomer at a polymerization temperature of 150° C. to 350° C. and having a hydroxyl value of 5 to 55 mg KOH/g, a glass transition temperature of −70° C. to 10° C., and a number average molecular weight of 500 to 20000, and a polyoxyalkylene compound having two or more isocyanate groups at its terminal.

JP 2013-224374 A discloses a curable resin composition including an acrylic polyol and an isocyanate compounds, wherein the acrylic polyol is a polyol having a glass transition temperature of −20° C. to 20° C. obtained by polymerizing a polymerizable monomer, and the isocyanate compound includes both an isocyanate having no aromatic ring and an isocyanate having an aromatic ring. This curable resin composition is used for an adhesive for a laminated sheet.

However, the cured product of the curable resin composition described in JP 2001-40328 A deteriorates due to hydrolysis and the like in a high-temperature and high-humidity environment required for electrical components mounted on vehicles such as automobiles, and thus lacks wet heat resistance. In addition, when the cured product is to be applied to such electrical components, heat resistance is also required.

Further, the curable resin composition described in JP 2013-224374 A is used for an adhesive for a laminated sheet. Therefore, the glass transition temperature of the acrylic polyol is set to high i.e. at −20 to 20° C. Because of this, the cured product of this curable resin composition lacks flexibility in a low-temperature environment required for vehicles, and a high stress may be generated when used at a low temperature which may cause cracking, peeling, or the like. Furthermore, when the cured product is to be applied to electrical components as described above, it is also important that the initial elongation (initial stretch) is good.

An object of the present disclosure is to provide a curable resin composition having wet heat resistance and heat resistance, and sufficient flexibility at low temperature, and capable of obtaining a cured product having good initial elongation at break, and an electrical component using the same.

One aspect of the present disclosure resides in a curable resin composition comprising: a (meth)acrylic polyol;
a hydrogenated polyolefin-based polyol; and
a polyisocyanate,
wherein the (meth)acrylic polyol includes a polymer having a hydroxyl value of 5 mg KOH/g or more and 150 mg KOH/g or less, a glass transition temperature of −70° C. or more and −40° C. or less, and a number average molecular weight of 500 or more and 20000 or less, and which is liquid at 25° C., and
the hydrogenated polyolefin-based polyol has an iodine value of 15 or less.

Another aspect of the present disclosure resides in an electrical component comprising a sealing member including a cured product of the curable resin composition.

Another aspect of the present disclosure resides in an electrical component comprising an adhesive layer for bonding a case and a lid together, wherein
the adhesive layer includes a cured product of the curable resin composition.

When the curable resin composition is cured, it forms urethane bonds and becomes a polyurethane-based cured product. Since the curable resin composition has the above-described configuration, the cured product has wet heat resistance and heat resistance, sufficient flexibility at low temperature, and good initial elongation at break.

Further, with regard to the electrical component having a sealing member composed of a cured product of the curable resin composition, the sealing member has wet heat resistance and heat resistance, sufficient flexibility at low temperature, and good initial elongation. Therefore, this electrical component has good reliability in long-term insulation and can be suitably used in vehicles such as automobiles.

As for the electrical component having an adhesive layer composed of a cured product of the curable resin composition, the adhesive layer has wet heat resistance and heat resistance, sufficient flexibility at low temperature, and good initial elongation. Therefore, this electrical component has good reliability in long-term insulation and can be suitably used in vehicles such as automobiles.

First Embodiment

Figure 1:
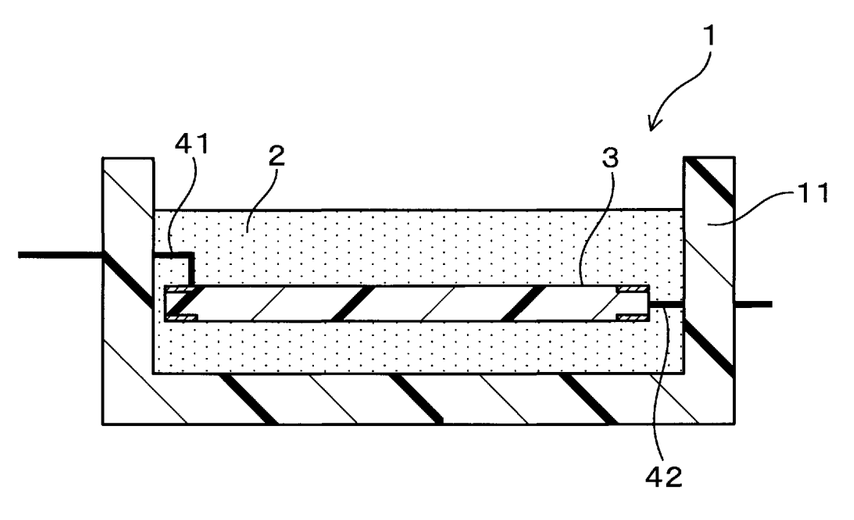
FIG. 1 is an overall cross-sectional view showing a schematic configuration of an electronic control unit according to a first embodiment, which is an example of an electrical component having a sealing member composed of a cured product of a curable resin composition.

The curable resin composition and the electrical component according to the first embodiment will be described with reference to FIG. 1. As exemplary illustrated in FIG. 1, the electrical component 1 of the present embodiment is, for example, an electronic control unit (i.e., an ECU) for a vehicle, and the curable resin composition of the present embodiment is used as a sealing member 2 for the electrical component 1. The electrical component 1 includes a case 11 made of resin, a substrate 3 housed inside the case 11, and the sealing member 2. Note that various electronic components (not shown) including an IC chip and a capacitor are mounted on the substrate 4. The sealing member 2 is formed of a cured product obtained by injecting the curable resin composition into the case 11 and curing it, and entirely covers the substrate 3 including the electronic components.

The substrate 3 is formed of, for example, a known printed wiring board. External connection terminals 41 and 42 are provided on the outer peripheral part of the substrate 3, and they extend to the outside penetrating the walls of the case 11. Note that, although not shown in the present embodiment, for example, the cured product of the curable resin composition may also be used as an adhesive layer of an electrical component such as an electronic control unit comprising a case in which a substrate provided with various electronic components is housed, a lid attached to the case, and the adhesive layer which bonds the case and the lid together.

The above-described curable resin composition contains (meth)acrylic polyol, hydrogenated polyolefin-based polyol, and polyisocyanate. The curable resin composition may be a two-part mixing type or a one-part moisture-curing type. Specific examples of the two-part mixing type include a two-part mixing composition used by mixing a main agent containing (meth)acrylic polyol and hydrogenated polyolefin-based polyol with a curing agent containing polyisocyanate; a two-part mixing composition used by mixing a urethane prepolymer including a structural unit derived from (meth)acrylic polyol and a structural unit derived from polyisocyanate and also having an isocyanate group at its terminal with hydrogenated polyolefin-based polyol; and a two-part mixing composition used by mixing a urethane prepolymer including a structural unit derived from hydrogenated polyolefin-based polyol and a structural unit derived from a polyisocyanate and also having an isocyanate group at its terminal with (meth)acrylic polyol. An example of the one-part moisture-curing type is a one-part moisture-curing composition cured by reacting a urethane prepolymer obtained by reacting (meth)acrylic polyol, hydrogenated polyolefin-based polyol, and polyisocyanate and having an isocyanate group at its terminal with moisture in the air.

In the curable resin composition, (meth)acrylic as used in (meth)acrylic polyol encompasses not only acryl but also methacryl. Specifically, the (meth)acrylic polyol is composed of a polymer that has a hydroxyl value of 5 mg KOH/g or more and 150 mg KOH/g or less, a glass transition temperature of −70° C. or more and −40° C. or less, a number average molecular weight of 500 or more and 20,000 or less, and is liquid at 25° C. Note that the polymer as used in the above encompasses not only polymers but also oligomers. Further, the polymer as used in the above may be either a homopolymer or a copolymer. The polymer is preferably a copolymer from the viewpoint of easy control of the physical properties of the cured product.

When the hydroxyl value of the (meth)acrylic polyol is less than 5 mg KOH/g, the curability is reduced, and the cured product may have poor wet heat resistance and heat resistance. The hydroxyl value is preferably 8 mg KOH/g or more, more preferably 12 mg KOH/g or more, and even more preferably 15 mg KOH/g or more in terms of ensuring wet heat resistance and heat resistance and the like. On the other hand, when the hydroxyl value exceeds 150 mg KOH/g, the cured product may become brittle due to excessive curing. The hydroxyl value is preferably 145 mg KOH/g or less, more preferably 140 mg KOH/g or less, and even more preferably 135 mg KOH/g or less in terms of ensuring flexibility at low temperature and the like. Note that the hydroxyl value is a value measured according to JIS-K1557-1.

The (meth)acrylic polyol preferably has a low glass transition temperature in terms of ensuring flexibility in a low-temperature environment after curing and the like. However, the glass transition temperature is −70° C. in view of the availability of the (meth)acrylic polyol or the like. On the other hand, when the glass transition temperature exceeds −40° C., it is difficult to ensure flexibility in a low-temperature environment required for a vehicle, and a high stress may be generated when used at a low temperature which may cause cracking, peeling, or the like. The glass transition temperature is preferably −45° C. or less, more preferably −50° C. or less, and even more preferably −55° C. or less in terms of ensuring sufficient flexibility at low temperature and the like. Note that the glass transition temperature is measured as inflection points of DSC according to JIS K7121.

When the number average molecular weight of the (meth) acrylic polyol is less than 500, the crosslink density of the cured product increases and the elastic modulus of the cured product increases, which raises the possibility of cracking and peeling occurring in a cold environment. The number average molecular weight is preferably 600 or more, more preferably 800 or more, and even more preferably 1000 or more in terms of suppressing the increase in the elastic modulus of the cured product and the like. On the other hand, when the number average molecular weight exceeds 20,000, workability may deteriorate due to an increase in the viscosity of the curable resin composition. The number average molecular weight can be preferably 18,000 or less, more preferably 16,000 or less, and even more preferably 14,000 or less in terms of easy maintenance of the low viscosity of the curable resin composition and the like. Note that the number average molecular weight is a value measured by GPC (gel permeation chromatography) using a solvent such as tetrahydrofuran (THF).

The (meth)acrylic polyol is liquid at 25° C. If the (meth) acrylic polyol is solid at 25° C., it needs to be dissolved in a solvent to prepare the curable resin composition. On the other hand, if the (meth)acrylic polyol is liquid at 25° C., there is no need to dissolve it in a solvent to prepare the curable resin composition, and the (meth)acrylic polyol can be mixed without a solvent. Further, according to the above-described curable resin composition, at the time of its preparation, good workability can be achieved since deterioration of workability such as the necessity of heating while mixing it is eliminated, and the composition can be relatively easily prepared at room temperature.

The hydrogenated polyolefin-based polyol has an iodine value of 15 or less. This improves the heat resistance of the cured product. In terms of improving the heat resistance and the like, the iodine value can be preferably 13 or less, more preferably 12 or less, and even more preferably 10 or less. Note that the iodine value is a value measured according to JIS K 0070-1992.

Specific examples of the hydrogenated polyolefin-based polyol of the curable resin composition include a hydrogenated product of a polyolefin-based polyol having a double bond (C=C), and a polyolefin-based polyol not having a double bond (C=C) in the main chain. They can be used alone or in combination of two or more kinds. Note that the term hydrogenated as used above includes not only the case where a double bond is changed into a single bond by hydrogenation or the like, but also the case where it is configured not to have a double bond in the main chain from the beginning. Specific examples of the hydrogenated polyolefin-based polyol include hydrogenated polyolefin polyols such as hydrogenated polybutadiene and hydrogenated polyisoprene.

The mass ratio of (meth)acrylic polyol and hydrogenated polyolefin-based polyol in the curable resin composition can be between 95:5 and 20:80. This configuration helps obtaining a cured product having wet heat resistance and heat resistance, sufficient flexibility at low temperature, and good initial elongation at break. Further, this configuration also aids obtaining a cured product having good initial strength as well as durability. The mass ratio of (meth)acrylic polyol to hydrogenated polyolefin-based polyol can be preferably 93:7 to 25:75, more preferably 90:10 to 27:73, and even more preferably 85:5 to 30:70.

The polyisocyanate of the curable resin composition may include an aliphatic polyisocyanate. According to this configuration, wet heat resistance of the cured product can be easily ensured. Further, according to this configuration, there is an advantage that the flexibility of the cured product is easily provided. Note that the curable resin composition may include one polyisocyanate or more polyisocyanates in combination.

Specific examples of aliphatic polyisocyanates include hexamethylene diisocyanate (HDI), isophorone diisocyanate (IPDI), and derivatives (modified products and the like) thereof. Among them, preferred examples of aliphatic polyisocyanates include hexamethylene diisocyanate and at least one of the hexamethylene diisocyanate derivatives. As compared with isophorone diisocyanate, hexamethylene diisocyanate and hexamethylene diisocyanate derivatives have less steric hindrance substituents around the isocyanate group, which is the reaction site, and have more reactivity. Therefore, according to this configuration, the cured product can be formed in a shorter time. Further, according to this configuration, there is an advantage that the curing temperature can be set lower.

Specific preferred examples of hexamethylene diisocyanate derivatives may include at least one selected from the group consisting of biuret-modified hexamethylene diisocyanate, isocyanurate-modified hexamethylene diisocyanate, adduct-modified hexamethylene diisocyanate, prepolymers of hexamethylene diisocyanate, and mixtures thereof. This configuration helps obtaining a cured product having wet heat resistance and heat resistance, sufficient flexibility at low temperature, and good initial elongation at break. Further, according to this configuration, there is an advantage that the physical properties of the cured product can be easily controlled.

The polyisocyanate of the curable resin composition may include aromatic polyisocyanate in addition to aliphatic polyisocyanate. According to this configuration, as compared with the case where aliphatic polyisocyanate is used alone as the polyisocyanate, the initial breaking strength and the adhesive strength of the cured product can be improved For example, by increasing the proportion of aromatic polyisocyanate, the initial breaking strength of the cured product is increased, and the adhesiveness is also improved.

Specific examples of the aromatic polyisocyanate include diphenylmethane diisocyanate (MDI) such as 2,2'-, 2,4'-, or 4,4'-diphenylmethane diisocyanate; 2,2'-, 2,6'-toluene diisocyanate (TDI); and derivatives (modified products and the like) thereof. Among them, preferred examples of the aromatic polyisocyanate include at least one of diphenylmethane diisocyanate and diphenylmethane diisocyanate derivatives. According to this configuration, it can react with the polyol with less heat to form the cured product. Further, according to this configuration, there are also advantages such as improvement in the breaking strength and adhesive strength of the cured product.

Specific examples of diphenylmethane diisocyanate derivatives include at least one selected from the group consisting of biuret-modified diphenylmethane diisocyanate, isocyanurate-modified diphenylmethane diisocyanate, adduct-modified diphenylmethane diisocyanate, prepolymers of diphenylmethane diisocyanate, and mixture thereof. According to this configuration, adjustment of the initial elongation at break of the cured product becomes easier. This configuration also facilitates further improving the breaking strength and the adhesive strength of the cured product.

When aliphatic polyisocyanate and aromatic polyisocyanate are used together as the polyisocyanate, the molar ratio between aliphatic polyisocyanate and aromatic polyisocyanate can be 9:1 to 5:5. This configuration facilitates obtaining a cured product having good balance between elongation and strength suitable for use as a sealing member or an adhesive layer of a vehicular electrical component. The molar ratio of aliphatic polyisocyanate and aromatic polyisocyanate can be preferably 8:2 to 5:5, more preferably 7:3 to 5:5, and even more preferably 6:4 to 5:5.

The polyisocyanate of the curable resin composition may be composed of a bifunctional polyisocyanate, a trifunctional polyisocyanate, or may comprise both a bifunctional polyisocyanate and a trifunctional polyisocyanate. When the polyisocyanate contains both a bifunctional polyisocyanate and a trifunctional polyisocyanate, the hardness of the cured product can be easily adjusted.

When the polyisocyanate contains both a bifunctional polyisocyanate and a trifunctional polyisocyanate, the molar ratio of the bifunctional polyisocyanate and trifunctional polyisocyanate can be 1:9 to 9:1. This configuration facilitates obtaining a cured product having good balance between elongation and strength suitable for use as a sealing member or an adhesive layer of a vehicular electrical component. The molar ratio of bifunctional polyisocyanate and trifunctional polyisocyanate can be preferably 2:8 to 8:2, more preferably 3:7 to 7:3, and even more preferably 6:4 to 4:6. Note that the bifunctional polyisocyanate may be selected from aliphatic polyisocyanates or aromatic polyisocyanates. Similarly, the trifunctional polyisocyanate may be selected from aliphatic polyisocyanates or aromatic polyisocyanates.

Examples of the other components contained in the curable resin composition include a diol having a molecular weight of less than 300, a plasticizer, a catalyst, and an additive added to a polyurethane-based curable resin composition. They can be used alone or in combination of two or more kinds. When the curable resin composition contains a diol having a molecular weight of less than 300, the following advantages are provided. A diol having a molecular weight of less than 300 can function as a diluent because it is a low molecular weight molecule. Therefore, in the above case, there is an advantage that the viscosity can be easily adjusted before the curable resin composition is cured. In addition, when a diol having a molecular weight of less than 300 is contained, there is an advantage that the distances between crosslinking points are shortened upon curing of the curable resin composition by crosslinking, which improves the strength of the cured product. The molecular weight of diol is preferably 250 or less, more preferably 230 or less, and even more preferably 200 or less in terms of improving the strength of the cured product and the like. The molecular weight of diol can be preferably 60 or more in terms of suppressing volatilization at high temperature and the like.

Specific examples of the diol having a molecular weight less than 300 include octane diol, nonane diol, hexane diol, butane diol, and ethylene glycol. Specific examples of the plasticizer include phthalic acid esters such as dioctyl phthalate and dinonyl phthalate, adipic acid esters such as dioctyl adipate and dinonyl adipate, trimellitic acids such as tris(2-ethylhexyl) trimellitate, and phosphate esters such as triethyl phosphate. Specific examples of the catalyst include amine compounds, tin compounds, and bismuth compounds.

The curable resin composition may contain the polyisocyanate in such a ratio that, to the total number of moles of OH of the (meth)acrylic polyol and the hydrogenated polyolefin-based polyol, NCO/OH is between 2/1 and ½. Further, when the curable resin composition contains a diol having a molecular weight less than 300, the curable resin composition may contain 0.5 parts by mass or more and 30 parts by mass or less of the diol having a molecular weight less than 300 to 100 parts by mass of the total of the (meth)acrylic polyol and the hydrogenated polyolefin-based polyol. When the curable resin composition contains a plasticizer, the curable resin composition may contain 3 parts by mass or more and 200 parts by mass or less of the plasticizer to 100 parts by mass of the total of the (meth)acrylic polyol and the hydrogenated polyolefin-based polyol. When the curable resin composition contains a catalyst, the curable resin composition may contain 0.0001 parts by mass or more and 5 parts by mass or less of the catalyst based on 100 parts by mass of the total of the (meth)acrylic polyol and the hydrogenated polyolefin-based polyol.

The curable resin composition described above is cured by, for example, heating or the like as needed to obtain a polyurethane-based cured product having a structural unit derived from the (meth)acrylic polyol, a structural unit derived from the hydrogenated polyolefin-based polyol, and a structural unit derived from the polyisocyanate.

EXPERIMENTAL EXAMPLES

<Preparation of Materials>
—(Meth)Acrylic Polyol—
(Meth)acrylic polyol (1) ("ARUFON UH-2000" manufactured by Toagosei Co., Ltd., hydroxyl value: 20 mg KOH/g, glass transition temperature Tg: −60° C., number average molecular weight: about 4000, a polyacrylic polyol composed of a copolymer that is liquid at 25° C.)
(Meth)acrylic polyol (2) (A synthesized product, hydroxyl value: 26 mg KOH/g, glass transition temperature Tg: 15° C., number average molecular weight: about 7000, a polyacrylic polyol composed of a copolymer that is solid at 25° C.)

The (meth)acrylic polyol (2) was synthesized as follows. 100 g of ethyl acetate (reagent) and 1 g of 2,2-azobisisobutyronitrile (AIBN) as a polymerization initiator were charged into a flask, and the mixture was refluxed at 80° C. Next, 40 g of methyl methacrylate, 40 g of butyl acrylate, 10 g of acrylonitrile, and 10 g of 2-hydroxyethyl methacrylate were slowly added dropwise, and after completing the addition, the mixture was heated and stirred for 4 hours to obtain a polyacrylic polyol having a solid content of 50%. After that, the solvent (ethyl acetate) was removed under reduced pressure to obtain a solid polyacrylic polyol.

—Polyolefin-Based Polyol—
Hydrogenated polyolefin-based polyol (1) ("GI 1000" manufactured by Nippon Soda Co., Ltd., a hydrogenated polybutadiene having a hydroxyl group in the skeleton, iodine value: 10, hydroxyl value: 67 mg KOH/g)
Hydrogenated polyolefin-based polyol (2) ("EPOL" manufactured by Idemitsu Kosan Co., Ltd., a hydrogenated polyisoprene having a hydroxyl group in the skeleton, iodine value: 7, hydroxyl value: 52 mg KOH/g)
Non-hydrogenated polyolefin-based polyol (1) ("R-45HT" manufactured by Idemitsu Kosan Co., Ltd., a general-purpose polybutadiene having a hydroxyl group in the skeleton, iodine value: 398, hydroxyl value: 47 mg KOH/g)

—Polyisocyanate—
Aliphatic polyisocyanate (1) (bifunctional) ("Duranate D101" manufactured by Asahi Kasei Corporation, a prepolymer of hexamethylene diisocyanate (HDI), NCO %: 19.6)
Aliphatic polyisocyanate (2) (trifunctional) ("Duranate TPA-100" manufactured by Asahi Kasei Corporation, an isocyanurate-modified hexamethylene diisocyanate (HDI), NCO %: 23)
Aromatic polyisocyanate (1) (bifunctional) ("Millionate MTL" manufactured by Tosoh Corporation, a carbodiimide-modified diphenylmethane diisocyanate (MDI), NCO %: 29)
Aromatic polyisocyanate (2) (trifunctional) ("Millionate MR-200" manufactured by Tosoh Corporation, an oligomer of diphenylmethane diisocyanate (MDI), NCO %: 31.2)

—Others—
Octanediol (manufactured by KH Neochem Co., Ltd., molecular weight 146)
Plasticizer ("TOTM" manufactured by J-PLUS Co., Ltd., tris(2-ethylhexyl) trimellitate)
Catalyst ("Neostann U600" manufactured by NITTO KASEI Co., Ltd., a bismuth compound)

<Preparation of Samples>
As shown in Tables 1 to 3 described below, octanediol, a plasticizer, and a catalyst were added to a total of 100 parts by mass of a predetermined (meth)acrylic polyol and a predetermined polyolefin-based polyol to prepare each main agent. Further, as shown in Tables 1 to 3 presented below, a predetermined polyisocyanate(s) was weighed and, if necessary, mixed (in the case where more than one kind of polyisocyanate are used) to prepare each curing agent. Then, each main agent was sufficiently mixed with the respective curing agent(s) at 25° C. to obtain curable resin compositions as samples. Note that, since the curable resin composition of Sample 6C was prepared using the (meth)acrylic polyol (2) which is solid at 25° C., it was necessary to heat it while mixing the agents to prepare the curable resin composition, and thus the workability was bad. Therefore, the subsequent experimental procedures were not performed on the curable resin composition of Sample 6C.

Next, each of the obtained curable resin compositions was cast into a rubber, No. 3 dumbbell-shaped mold and cured at 120° C. for 3 hours to obtain a cured product of each sample.

<Wet Heat Resistance>

A tensile test was performed on each cured product. The tensile test was performed using an "Autograph" manufactured by Shimadzu Corporation at 25° C. and at a tensile speed of 200 mm/min. Further, each cured product was subjected to a pressure cooker (PCT) test. In the pressure cooker test, each cured product was placed in the test tank at 121° C., 2 atm, and 100% humidity for 168 hours. After being subjected to the pressure cooker test, each cured product was subjected to a tensile test in the same manner as described above. The storage modulus E' of each cured product before and after the pressure cooker test was measured, and the storage modulus E' retention rate was determined. The storage modulus E' retention rate was calculated by the following formula: 100×(storage modulus E' of cured product after pressure cooker test)/(storage modulus E' of cured product before pressure cooker test). Cases where the storage modulus E' retention rate was 80% or more and less than 120% were rated as "A+" as having excellent wet heat resistance, cases where the storage modulus E' retention rate was 120% or more and less than 150%, or 50% or more and less than 80% were rated as "A" as having wet heat resistance, and cases where the storage modulus E' retention rate was 150% or more, or less than 50% were rated as "C" as having no wet heat resistance.

<Heat Resistance>

After putting each cured product in a thermostat at 150° C. for 1000 hours, a tensile test was performed on each of them. The tensile test was performed under the conditions described above in <Wet heat resistance>. After the tensile test, the storage modulus E' of each cured product was measured. Cases where the storage modulus E' was 5 MPa or less were rated as "A" as having heat resistance, and cases where the storage modulus E' was more than 5 MPa were rated as "C" as having no heat resistance.

<Flexibility at Low Temperature>

Each of the above-described curable resin compositions was cured at 120° C. for 3 hours to obtain rectangular cured products each having a length of 40 mm×a width of 5 mm×a thickness of 1 mm. Viscoelasticity measurement was performed on each of the obtained cured products, and the temperature at the inflection point of the elastic modulus was determined as the glass transition temperature Tg. The conditions of the viscoelasticity measurement were as follows; between −100° C. and 25° C., temperature increase rate: 5° C./min, strain: 1%, and frequency: 1 Hz. "RHEOVIBRON DDV-25FP", manufactured by Orientec Corporation, was used as the viscoelasticity measuring device. Cases where Tg was −40° C. or less were rated as "A" as having sufficient flexibility at low temperature, and cases where Tg was more than −40° C. were rated as "C" as being inferior in flexibility at low temperature.

<Initial Elongation at Break>

A tensile test was performed on each of the dumbbell-shaped cured products under the same conditions as described above. The elongation of the cured product when it broke was determined as the initial elongation at break of the cured product. Cases where the initial elongation at break was 100% or more were rated as "A+" as having excellent initial elongation at break, cases where the initial elongation at break was 50% or more and less than 100% were rated as "A" as having good initial elongation at break, and cases where the initial elongation at break was less than 50% were rated as "C" as having poor initial elongation at break.

Tables 1 to 3 collectively show detailed formulations of the curable resin compositions, evaluation results of the cured products, and the like.

TABLE 1

| | | | Sample | | | | | | | | |
|---|---|---|---|---|---|---|---|---|---|---|---|
| | | Remarks | 1 | 2 | 3 | 4 | 5 | 6 | 7 | 8 | 9 |
| | (Meth)acrylic polyol | | | | | | | | | | |
| Curable resin composition (parts by mass) | (Meth)acrylic polyol (1) | Hydroxyl value: 20 mg KOH/g, Tg: −60° C., number average molecular weight: about 4000, liquid at 25° C. | 95 | 80 | 60 | 40 | 20 | 95 | 80 | 60 | 80 |
| | (Meth)acrylic polyol (2) | Hydroxyl value: 26 mg KOH/g, Tg: 15° C., number average molecular weight: about 7000, solid at 25° C. | — | — | — | — | — | — | — | — | — |
| | Polyolefin-based polyol | | | | | | | | | | |
| | Hydrogenated polyolefin-based polyol (1) | Iodine value: 10 | 5 | 20 | 40 | 60 | 80 | — | — | — | 20 |
| | Hydrogenated polyolefin-based polyol (2) | Iodine value: 7 | — | — | — | — | — | 5 | 20 | 40 | — |
| | Non-hydrogenated polyolefin-based polyol (1) | Iodine value: 398 | — | — | — | — | — | — | — | — | — |
| | Polyisocyanate | | | | | | | | | | |
| | Aliphatic polyisocyanate (1) | Bifunctional, HDI prepolymer | 11.6 | 13.0 | 14.8 | 16.6 | 18.4 | 11.5 | 12.4 | 13.6 | 2.6 |
| | Aliphatic polyisocyanate (2) | Trifunctional, isocyanurate-modified HDI | 9.9 | 11.0 | 12.6 | 14.1 | 15.6 | 9.8 | 10.5 | 11.6 | 19.9 |

TABLE 1-continued

|  | Remarks | Sample 1 | 2 | 3 | 4 | 5 | 6 | 7 | 8 | 9 |
|---|---|---|---|---|---|---|---|---|---|---|
| Aromatic polyisocyanate (1) | Bifunctional, carbodiimide-modified MDI | — | — | — | — | — | — | — | — | — |
| Aromatic polyisocyanate (2) | Trifunctional, MDI oligomer | — | — | — | — | — | — | — | — | — |
| Others | | | | | | | | | | |
| Octanediol | Molecular weight: 146 | 5 | 5 | 5 | 5 | 5 | 5 | 5 | 5 | 5 |
| Plasticizer | — | 20 | 20 | 20 | 20 | 20 | 20 | 20 | 20 | 20 |
| Catalyst | — | 0.02 | 0.02 | 0.02 | 0.02 | 0.02 | 0.02 | 0.02 | 0.02 | 0.02 |
| Molar ratios of bifunctional polyisocyanate and trifunctional polyisocyanate in curable resin composition | Aliphatic polyisocyanate (1) | 5 | 5 | 5 | 5 | 5 | 5 | 5 | 5 | 1 |
|  | Aliphatic polyisocyanate (2) | 5 | 5 | 5 | 5 | 5 | 5 | 5 | 5 | 9 |
|  | Aromatic polyisocyanate (1) | — | — | — | — | — | — | — | — | — |
|  | Aromatic polyisocyanate (2) | — | — | — | — | — | — | — | — | — |
| Evaluations | Wet heat resistance: Storage modulus E' retention rate (%) of cured product by pressure cooker test | 97 A+ | 94 A+ | 94 A+ | 92 A+ | 90 A+ | 90 A+ | 88 A+ | 75 A | 78 A |
|  | Heat resistance: Storage modulus E' (MPa) of cured product after 1000 hours at 150° C. | 2.0 A | 2.5 A | 3.2 A | 3.6 A | 3.9 A | 1.9 A | 3.0 A | 3.4 A | 2.9 A |
|  | Flexibility at low temperature: Tg of cured product (° C.) | −60 A | −58 A | −52 A | −47 A | −41 A | −60 A | −56 A | −51 A | −55 A |
|  | Initial elongation at break of cured product (%) | 95 A | 162 A+ | 165 A+ | 178 A+ | 205 A+ | 109 A+ | 180 A+ | 191 A+ | 102 A+ |

TABLE 2

|  |  | Remarks | Sample 10 | 11 | 12 | 13 | 14 | 15 | 16 | 17 |
|---|---|---|---|---|---|---|---|---|---|---|
| Curable resin composition (parts by mass) | (Meth)acrylic polyol | | | | | | | | | |
|  | (Meth)acrylic polyol (1) | Hydroxyl value: 20 mg KOH/g, Tg: −60° C., number average molecular weight: about 4000, liquid at 25° C. | 80 | 80 | 80 | 80 | 80 | 80 | 80 | 80 |
|  | (Meth)acrylic polyol (2) | Hydroxyl value: 26 mg KOH/g, Tg: 15° C., number average molecular weight: about 7000, solid at 25° C. | — | — | — | — | — | — | — | — |
|  | Polyolefin-based polyol | | | | | | | | | |
|  | Hydrogenated polyolefin-based polyol (1) | Iodine value: 10 | 20 | 20 | 20 | 20 | 20 | 20 | 20 | 20 |
|  | Hydrogenated polyolefin-based polyol (2) | Iodine value: 7 | — | — | — | — | — | — | — | — |
|  | Non-hydrogenated polyolefin-based polyol (1) | Iodine value: 398 | — | — | — | — | — | — | — | — |
|  | Polyisocyanate | | | | | | | | | |
|  | Aliphatic polyisocyanate (1) | Bifunctional, HDI prepolymer | 6.5 | 19.5 | 23.4 | 23.4 | 19.5 | 17.4 | 13.0 | 6.5 |
|  | Aliphatic polyisocyanate (2) | Trifunctional, isocyanurate-modified HDI | 16.6 | 5.5 | 2.2 | — | — | — | — | — |
|  | Aromatic polyisocyanate (1) | Bifunctional, carbodiimide-modified MDI | — | — | — | — | — | — | — | — |
|  | Aromatic polyisocyanate (2) | Trifunctional, MDI oligomer | — | — | — | 1.6 | 4.1 | 5.4 | 8.2 | 12.3 |
|  | Others | | | | | | | | | |
|  | Octanediol | Molecular weight: 146 | 5 | 5 | 5 | 5 | 5 | 5 | 5 | 5 |
|  | Plasticizer | — | 20 | 20 | 20 | 20 | 20 | 20 | 20 | 20 |
|  | Catalyst | — | 0.02 | 0.02 | 0.02 | 0.02 | 0.02 | 0.02 | 0.02 | 0.02 |

TABLE 2-continued

|  | Remarks | Sample 10 | 11 | 12 | 13 | 14 | 15 | 16 | 17 |
|---|---|---|---|---|---|---|---|---|---|
| Molar ratios of bifunctional polyisocyanate and trifunctional polyisocyanate in curable resin composition | Aliphatic polyisocyanate (1) | 1 | 3 | 9 | 9 | 3 | 2 | 5 | 1 |
|  | Aliphatic polyisocyanate (2) | 3 | 1 | 1 | — | — | — | — | — |
|  | Aromatic polyisocyanate (1) | — | — | — | — | — | — | — | — |
|  | Aromatic polyisocyanate (2) | — | — | — | 1 | 1 | 1 | 5 | 3 |
| Evaluations | Wet heat resistance: Storage modulus E' retention rate (%) of cured product by pressure cooker test | 81 A+ | 77 A | 66 A | 76 A | 70 A | 65 A | 58 A | 52 A |
|  | Heat resistance: Storage modulus E' (MPa) of cured product after 1000 hours at 150° C. | 2.5 A | 2.3 A | 2.0 A | 2.5 A | 2.9 A | 3.3 A | 3.5 A | 3.8 A |
|  | Flexibility at low temperature: Tg of cured product (° C.) | −56 A | −62 A | −65 A | −58 A | −58 A | −56 A | −56 A | −52 A |
|  | Initial elongation at break of cured product (%) | 155 A+ | 187 A+ | 226 A+ | 206 A | 180 A+ | 135 A+ | 102 A+ | 82 A |

TABLE 3

|  |  | Remarks | Sample 1C | 2C | 3C | 4C | 5C | 6C |
|---|---|---|---|---|---|---|---|---|
| Curable resin composition (parts by mass) | (Meth)acrylic polyol | | | | | | | |
|  | (Meth)acrylic polyol (1) | Hydroxyl value: 20 mg KOH/g, Tg: −60° C., number average molecular weight: about 4000, liquid at 25° C. | 100 | — | — | — | 80 | — |
|  | (Meth)acrylic polyol (2) | Hydroxyl value: 26 mg KOH/g, Tg: 15° C., number average molecular weight: about 7000, solid at 25° C. | — | — | — | — | — | 80 |
|  | Polyolefin-based polyol | | | | | | | |
|  | Hydrogenated polyolefin-based polyol (1) | Iodine value: 10 | — | 100 | — | — | — | 20 |
|  | Hydrogenated polyolefin-based polyol (2) | Iodine value: 7 | — | — | 100 | — | — | — |
|  | Non-hydrogenated polyolefin-based polyol (1) | Iodine value: 398 | — | — | — | 100 | 20 | — |
|  | Polyisocyanate | | | | | | | |
|  | Aliphatic polyisocyanate (1) | Bifunctional, HDI prepolymer | — | — | — | — | — | — |
|  | Aliphatic polyisocyanate (2) | Trifunctional, isocyanurate-modified HDI | — | — | — | — | — | — |
|  | Aromatic polyisocyanate (1) | Bifunctional, carbodiimide-modified MDI | — | — | — | 21.9 | — | — |
|  | Aromatic polyisocyanate (2) | Trifunctional, MDI oligomer | 14.1 | 25.4 | 21.7 | — | 17.3 | 14.4 |
|  | Others | | | | | | | |
|  | Octanediol | Molecular weight: 146 | 5 | 5 | 5 | 5 | 6 | 6 |
|  | Plasticizer | — | 20 | 20 | 20 | 20 | 20 | 20 |
|  | Catalyst | — | 0.02 | 0.02 | 0.02 | 0.02 | 0.02 | 0.02 |
| Molar ratios of bifunctional polyisocyanate and trifunctional polyisocyanate in curable resin composition | Aliphatic polyisocyanate (1) | | — | — | — | — | — | — |
|  | Aliphatic polyisocyanate (2) | | — | — | — | — | — | — |
|  | Aromatic polyisocyanate (1) | | — | — | — | 10 | — | — |
|  | Aromatic polyisocyanate (2) | | 10 | 10 | 10 | — | 10 | 10 |

TABLE 3-continued

| | | Sample | | | | | |
|---|---|---|---|---|---|---|---|
| | Remarks | 1C | 2C | 3C | 4C | 5C | 6C |
| Evaluations | Wet heat resistance: Storage modulus E' retention rate (%) of cured product by pressure cooker test | 40<br>C | 30<br>C | 34<br>C | 183<br>C | 110<br>A+ | —<br>— |
| | Heat resistance: Storage modulus E' (MPa) of cured product after 1000 hours at 150° C. | 2.8<br>A | 5.5<br>C | 5.3<br>C | >100<br>C | 44.5<br>C | —<br>— |
| | Flexibility at low temperature: Tg of cured product (° C.) | −60<br>A | −35<br>C | −53<br>A | −62<br>A | −62<br>A | —<br>— |
| | Initial elongation at break of cured product (%) | 48<br>C | 52<br>C | 240<br>A+ | 120<br>A+ | 81<br>A | —<br>— |

According to Tables 1 to 3, the cured products of Samples 1 to 17 obtained by curing the curable resin compositions having the structures of Samples 1 to 17 have wet heat resistance and heat resistance, sufficient flexibility at low temperature, and good initial elongation at break. Thus, it can be said that applying these samples to, for example, a sealing member or an adhesive layer of an electrical component of a vehicle is advantageous for improving the reliability of long-term insulation of the electrical component.

On the other hand, the curable resin composition of Sample 1C contains (meth)acrylic polyol alone as the polyol and does not contain hydrogenated polyolefin-based polyol (iodine value: 15 or less). Therefore, the cured product of the curable resin composition of Sample 1C was inferior in wet heat resistance and initial elongation at break. On the other hand, the curable resin compositions of Samples 2C and 3C contain hydrogenated polyolefin-based polyol (iodine value: 15 or less) alone as the polyol and do not contain (meth) acrylic polyol. Therefore, the cured product of the curable resin composition of Sample 2C was inferior in all of wet heat resistance, heat resistance, flexibility at low temperature, and initial elongation at break. The cured product of the curable resin composition of Sample 3C was inferior in wet heat resistance and heat resistance. The curable resin composition of Samples 4C contains non-hydrogenated polyolefin-based polyol (iodine value: more than 15) alone as the polyol and does not contain (meth)acrylic polyol. Therefore, the cured product of the curable resin composition of Sample 4C was inferior in wet heat resistance and heat resistance. The curable resin composition of Sample 5C combines (meth)acrylic polyol and non-hydrogenated polyolefin-based polyol (iodine value: more than 15) as the polyol. Thus, the cured product of the curable resin composition of Sample 5C was inferior in heat resistance. As described above, the curable resin composition of Sample 6C was poor in workability in the preparation of the composition.

The present disclosure is not limited to the above embodiments and experimental examples, and various changes can be made without departing from the gist of the present disclosure. In addition, the configurations of the embodiments and the experimental examples can be combined as appropriate. That is, although the present disclosure is described based on embodiments, it should be understood that the present disclosure is not limited to the embodiments, structures, and the like. The present disclosure encompasses various modifications and variations within the scope of equivalence. In addition, the scope and the spirit of the present disclosure include other combinations and embodiments, only one component thereof, and other combinations and embodiments that are more than that or less than that.

What is claimed is:

1. A curable resin composition comprising:
    a (meth)acrylic polyol;
    a hydrogenated polyolefin-based polyol; and
    a polyisocyanate,
    wherein:
        the (meth)acrylic polyol includes a polymer having a hydroxyl value of 5 mg KOH/g or more and 150 mg KOH/g or less, a glass transition temperature of −70° C. or more and −40° C. or less, and a number average molecular weight of 500 or more and 20000 or less, and which is liquid at 25° C.;
        the hydrogenated polyolefin-based polyol has an iodine value of 15 or less;
        the polyisocyanate includes both a bifunctional polyisocyanate and a trifunctional polyisocyanate; and
        when the curable resin composition is cured, it forms urethane bonds and becomes a polyurethane-based cured product.

2. The curable resin composition according to claim 1, wherein the polyisocyanate includes an aliphatic polyisocyanate.

3. The curable resin composition according to claim 2, wherein the aliphatic polyisocyanate is at least one of a hexamethylene diisocyanate and a hexamethylene diisocyanate derivative.

4. The curable resin composition according to claim 3, wherein the hexamethylene diisocyanate derivative is at least one selected from the group consisting of a biuret-modified hexamethylene diisocyanate, an isocyanurate-modified hexamethylene diisocyanate, an adduct-modified hexamethylene diisocyanate, a prepolymer of hexamethylene diisocyanate, and a mixture thereof.

5. The curable resin composition according to claim 1, wherein a molar ratio of the bifunctional polyisocyanate and the trifunctional polyisocyanate is from 1:9 to 9:1.

6. The curable resin composition according to claim 2, wherein the polyisocyanate further includes an aromatic polyisocyanate.

7. The curable resin composition according to claim 6, wherein a molar ratio of the aliphatic polyisocyanate and the aromatic polyisocyanate is from 9:1 to 5:5.

8. The curable resin composition according to claim 1, further comprising a diol having a molecular weight less than 300.

9. The curable resin composition according to claim 1, wherein a mass ratio of the (meth)acrylic polyol and the hydrogenated polyolefin-based polyol is from 95:5 to 20:80.

10. An electrical component comprising a sealing member including a cured product of the curable resin composition according to claim 1.

11. An electrical component comprising an adhesive layer for bonding a case and a lid together, wherein
the adhesive layer includes a cured product of the curable resin composition according to claim 1.

12. A curable resin composition comprising:
a (meth)acrylic polyol;
a hydrogenated polyolefin-based polyol; and
a polyisocyanate,
wherein:
   the (meth)acrylic polyol includes a polymer having a hydroxyl value of 5 mg KOH/g or more and 150 mg KOH/g or less, a glass transition temperature of −70° C. or more and −40° C. or less, and a number average molecular weight of 500 or more and 20000 or less, and which is liquid at 25° C.;
   the hydrogenated polyolefin-based polyol has an iodine value of 15 or less; and
   a mass ratio of the (meth)acrylic polyol and the hydrogenated polyolefin-based polyol is from 95:5 to 20:80, and when the curable resin composition is cured, it forms urethane bonds and becomes a polyurethane-based cured product.

\* \* \* \* \*